US012590548B1

(12) United States Patent
Varney et al.

(10) Patent No.: US 12,590,548 B1
(45) Date of Patent: Mar. 31, 2026

(54) UNDER-RING OIL FEED FOR SQUEEZE FILM BEARING DAMPER

(71) Applicant: RTX Corporation, Farmington, CT (US)

(72) Inventors: Philip Andrew Varney, Coventry, CT (US); Kevin L. Zacchera, Glastonbury, CT (US); Ulf J. Jonsson, South Windsor, CT (US); Sean Patrick Waters, South Windsor, CT (US); Po Hsien Lin, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/202,117

(22) Filed: May 8, 2025

(51) Int. Cl.
*F01D 25/16* (2006.01)
*F01D 25/18* (2006.01)
*F02C 3/04* (2006.01)

(52) U.S. Cl.
CPC ......... *F01D 25/183* (2013.01); *F01D 25/164* (2013.01); *F02C 3/04* (2013.01); *F05D 2240/55* (2013.01); *F05D 2260/98* (2013.01)

(58) Field of Classification Search
CPC .............................. F01D 25/183; F01D 25/164
See application file for complete search history.

(56) References Cited

U.S. PATENT DOCUMENTS 9,644,541 B2     5/2017  Morreale et al.
9,841,056 B2    12/2017  Snow et al.

10,920,615 B2 *   2/2021  Jonsson ..................... F16F 9/10
11,181,008 B1 *  11/2021  Jonsson .................. F16C 19/06
11,971,054 B2     4/2024  Payyoor et al.
2024/0125356 A1   4/2024  Potnuru et al.

FOREIGN PATENT DOCUMENTS

JP            5974582 B2     8/2016

* cited by examiner

*Primary Examiner* — Sabbir Hasan

(74) *Attorney, Agent, or Firm* — Carlson, Gaskey & Olds, P.C.

(57) ABSTRACT

A gas turbine engine includes a turbine section and a compressor section. The turbine section and the compressor section each include rotors, with a first turbine rotor driving a first compressor rotor through at least one shaft. At least one bearing compartment includes static structure and at least one bearing supports the at least one shaft for rotation about a rotational axis. A damper chamber is defined radially between an outer surface of the at least one bearing and an inner surface of the static structure. The damper chamber is defined by axially spaced seals received in seal ring grooves. A lubricant supply supplies lubricant into the damper chamber, and into the seal ring grooves. The lubricant supply includes at least one of an inner passage on an opposed radial side of the seal ring grooves relative to the damper chamber and/or an axially aligned passage directly radially outward of each of the seal ring groove or a cutout in a supporting structure supporting the at least one bearing and over a limited circumferential extent, and extending to connect the seal ring grooves.

6 Claims, 9 Drawing Sheets

UNDER-RING OIL FEED FOR SQUEEZE FILM BEARING DAMPER

BACKGROUND

This application relates to a structure for providing additional oil underneath seal rings defining a chamber providing a bearing damper.

Gas turbine engines are known, and typically include a propulsor delivering air as propulsion air. The air is also delivered into a compressor section where it is mixed with fuel and ignited.

Products of this combustion pass downstream over turbine rotors, driving them to rotate. Shafts connect the various rotating portions.

Bearings support the shaft. In operational conditions of the gas turbine engine the bearing may move off its rotational axis. As an example, so called bowed rotor starts are particularly challenging for the bearings, and the bearings must be able to adjust.

As such, a squeeze damper may be provided between a bearing and static structure. Lubricant is received in the damper chamber, and serves to dampen the bearing movement.

SUMMARY

In another featured embodiment, a gas turbine engine includes a turbine section and a compressor section. The turbine section and the compressor section each include rotors, with a first turbine rotor driving a first compressor rotor through at least one shaft. At least one bearing compartment includes static structure and at least one bearing supports the at least one shaft for rotation about a rotational axis. A damper chamber is defined radially between an outer surface of the at least one bearing and an inner surface of the static structure. The damper chamber is defined by axially spaced seals received in seal ring grooves. A lubricant supply supplies lubricant into the damper chamber, and into the seal ring grooves. The lubricant supply includes at least one of an inner passage on an opposed radial side of the seal ring grooves relative to the damper chamber and/or an axially aligned passage directly radially outward of each of the seal ring groove or a cutout in a supporting structure supporting the at least one bearing and over a limited circumferential extent, and extending to connect the seal ring grooves.

In another embodiment according to the previous embodiment, a radially inwardly extending passage is positioned axially intermediate the seal ring grooves, and provides lubricant into the inner passage.

In another embodiment according to any of the previous embodiments, there is an inner lubricant supply supplying lubricant into the inner passage.

In another embodiment according to any of the previous embodiments, there is an outer lubricant supply supplying lubricant into the damper chamber.

In another embodiment according to any of the previous embodiments, there is an outer lubricant supply supplying lubricant into the damper chamber, and the inner passage communicates between the oil seal ring grooves.

In another embodiment according to any of the previous embodiments, there is an outer lubricant supply supplying lubricant into axially extending arms that extend to a radially inwardly extending passage at axial positions outward of the seal ring grooves, and communicating with the inner passage.

In another embodiment according to any of the previous embodiments, there are a plurality of inner passages.

In another embodiment according to any of the previous embodiments, there is an inner lubricant supply supplying lubricant into the inner passage.

In another embodiment according to any of the previous embodiments, the cutout is in the supporting structure to communicate the at least two oil seal ring grooves over a limited circumferential extent.

In another embodiment according to any of the previous embodiments, the cutout includes an axially extending portion in an outer face of the supporting structure communicating with radially extending recesses in each of the seal walls.

In another embodiment according to any of the previous embodiments, there is the inner passage and the axially aligned passage.

In another embodiment according to any of the previous embodiments, there is the axially aligned passages.

In another embodiment according to any of the previous embodiments, the at least one bearing is a rolling element bearing, and there is supporting structure connecting an outer portion of the rolling element bearing to the static structure.

In another embodiment according to any of the previous embodiments, the supporting structure includes a flexible portion.

In another embodiment according to any of the previous embodiments, the flexible portion is attached to the static structure, and extending to a less flexible portion attached to the ball bearing outer race, and the inner passage, the axially aligned passage or the cutout are formed in the less flexible portion of the supporting structure.

In another featured embodiment, a gas turbine engine includes a turbine section and a compressor section. The turbine section and the compressor section each include rotors, with a first turbine rotor driving a first compressor rotor through at least one shaft. At least one bearing compartment includes static structure and at least one bearing supporting the at least one shaft for rotation about a rotational axis. A damper chamber is defined radially between an outer surface of the at least one bearing and an inner surface of the static structure. The damper chamber is defined by axially spaced seals received in seal ring grooves. A lubricant supply supplies lubricant into the damper chamber, and into the seal ring grooves. The lubricant supply includes at least one inner passage on an opposed radial side of the seal ring grooves relative to the damper chamber.

In another embodiment according to any of the previous embodiments, the at least one bearing is a rolling element bearing, and there is supporting structure connecting an outer portion of the rolling element bearing to the static structure.

In another embodiment according to any of the previous embodiments, the supporting structure includes a flexible portion attached to the static structure, and extending to a less flexible portion attached to the ball bearing outer race.

In another embodiment according to any of the previous embodiments, a radially inwardly extending passage is positioned axially intermediate the seal ring grooves, and provides lubricant into the inner passage.

In another embodiment according to any of the previous embodiments, there is an inner lubricant supply supplying lubricant into the inner passage.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
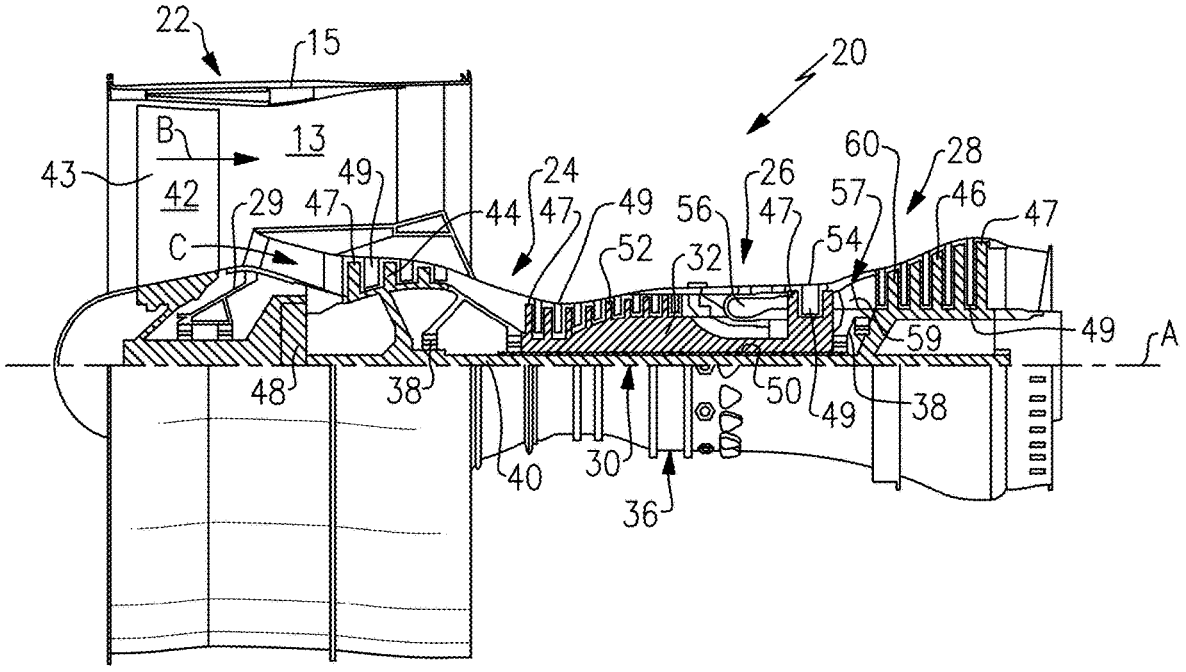
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition— typically cruise at about 0.8 M ach and about 35,000 feet (10,668 meters). The flight condition of 0.8 M ach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (OF). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
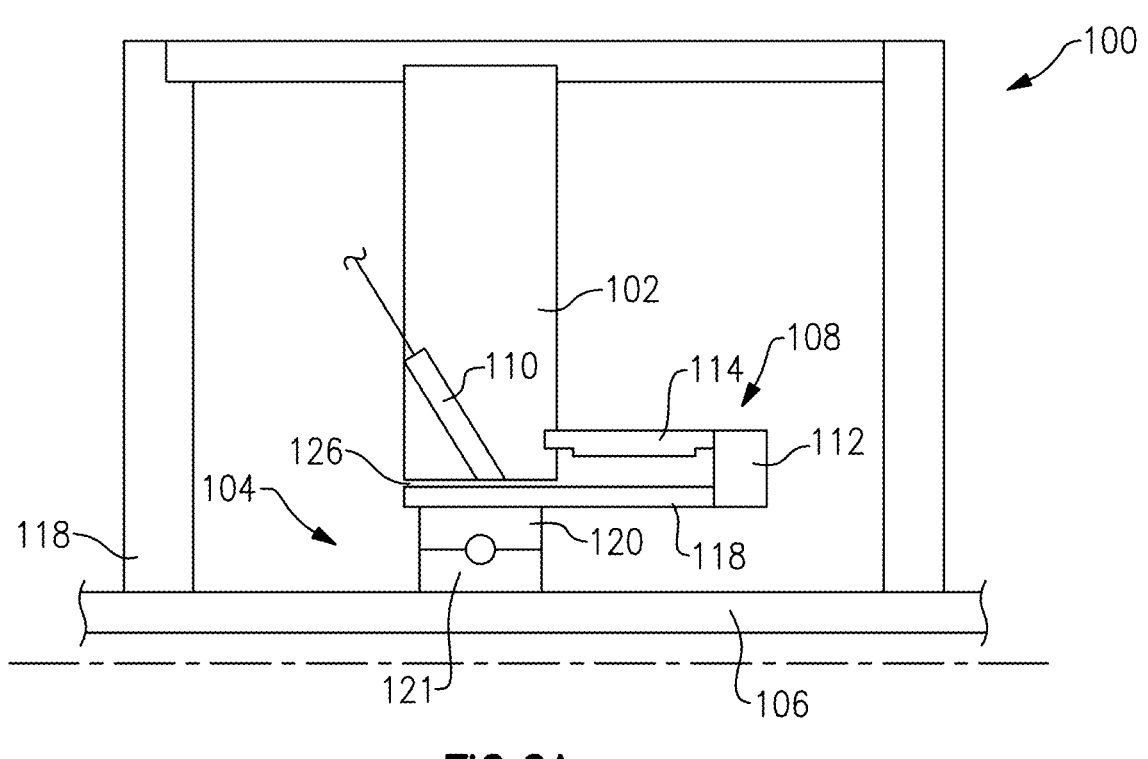
FIG. 2A shows a bearing compartment as known.

FIG. 2A shows a known bearing compartment 100 having static structure 102 and a bearing 104 supporting shaft 106. While the bearing 104 is shown as a ball bearing this disclosure will benefit other types of bearings. In embodiments, the bearing may be a rolling element bearing such as a ball bearing, a needle bearing, a roller bearing, a tape roller bearing, a spherical roller bearing or other type rolling element bearings. There is a static outer race 120 and inner race 121 rotating with shaft 106. In this embodiment a flexible centering spring 108 attaches the static surface 102 to the bearing 104. Static surface 102 includes an attachment to a spring portion 114 extending to an axial end portion 112.

Axial end portion 112 is attached to a bearing connection portion 118 that is actually fixed to the outer race 120. A damper annulus 126 is provided radially between the static surface 102 and the bearing 104. It should be understood that within the bearing compartment 100 lubricant is delivered as shown schematically at 110. While shown at a vertically upper end of compartment 100, in practice it is generally at a vertically lower location. In practice it may be supplied at any circumferential position. That lubricant passes into the annulus 126 and provides a damper force as the bearing 104 moves relative to the static surface 102.

The portion 114 of the flexible centering spring 108 is flexible, and thus allows the bearing 104 to move radially relative to the static structure 102. As this occurs, oil within the annulus 126 acts as a damper. In other embodiments, connection portion 118 may be flexible. In other embodiments both portions 114 and 118 may be flexible.

As shown, a single oil supply 110 delivers lubricant into the damper 126. Other damper configurations may use multiple oil supply lines.

Figure 2B:
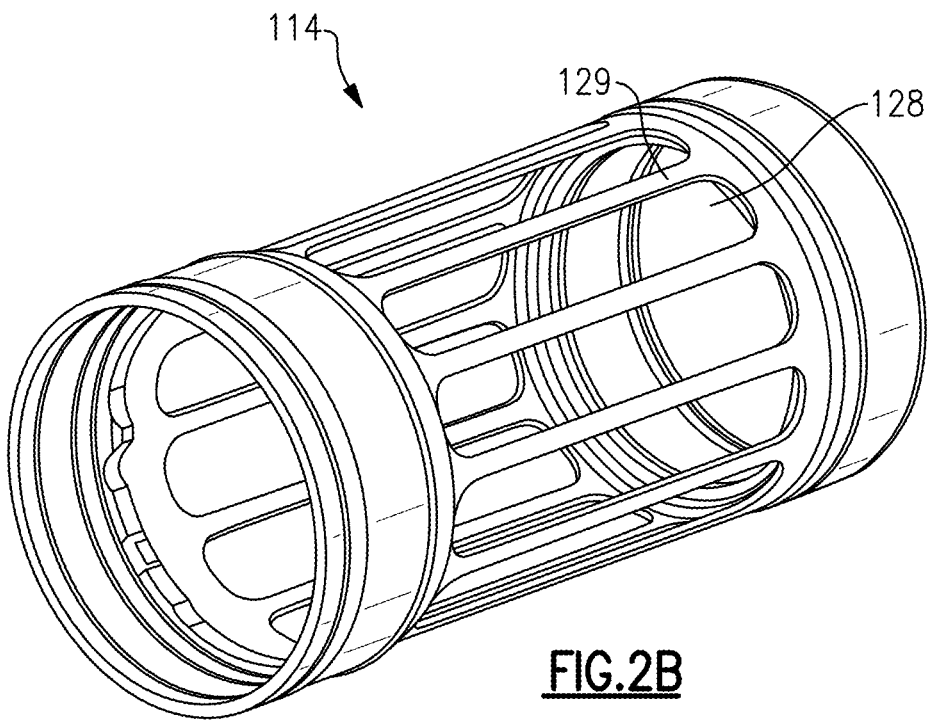
FIG. 2B shows a flexible mount for a bearing.

FIG. 2B shows a detail of one style flexible portion 114. In this embodiment, there are openings 128 separated by bars 129 to provide the flexibility. Thus, as the bearing 104 moves with the shaft 106, the bearing can also flex toward and away from the damper chamber 126.

With the prior art, there is sometimes insufficient oil delivered into the damper 126.

Figures 3, 4:
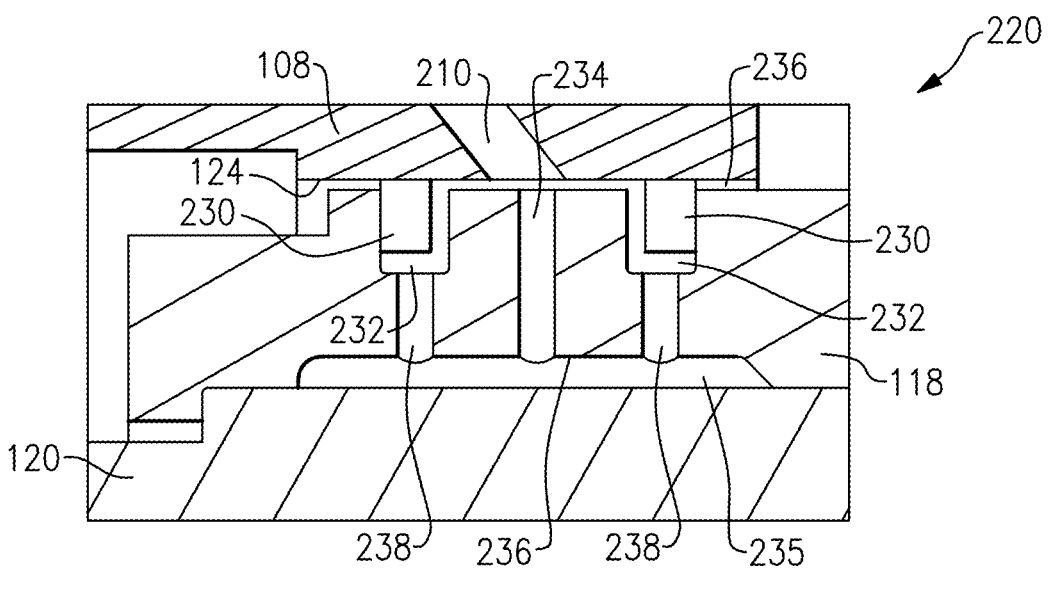
FIG. 3 shows a first embodiment oil supply for a bearing damper.
FIG. 4 shows a second embodiment oil supply for a bearing damper.

FIG. 3 shows an embodiment 220 of a damper chamber 226 under this disclosure. A main oil feed 210 extends through static structure 108. The bearing outer race 120 is spaced on an opposed side of structure 118 which is fixed to move with the outer race 120 of the bearing. As shown, there are seals 230 received in seal ring grooves 232. As can be appreciated, there is an area inward of the seals 230. The lubricant is driven into the area in the seal ring grooves 232 beneath the seals 230 to ensure adequate lubrication. In effect, the seal ring grooves 232 themselves become additional dampers. The oil may travel around the seals 230 and to the area beneath the seals 230 in the seal ring groove 232.

Further, an additional line 234 extends through the mount portion 118 and into an inner passage 235. Passage 235 communicates with passages 238 that supply lubricant back into the seal ring grooves 232. In fact there might be a plurality of supply lines 234 around the circumference of the damper. Now, there will be a good deal more lubricant in the seal ring grooves 232 than is the case in the prior art.

For purposes of this application "inner passage" could be seen as being on an opposed radial side of the seal ring grooves from the damper.

FIG. 4 shows an embodiment 240 wherein elements generally provide the same function as the FIG. 3 embodiment are identified by the same number. Here, however, a supply 242 supplies lubricant into an inner passage 243 to communicate with the passages 238. A gain, a good deal more of lubricant is thus delivered into the seal ring grooves 232.

Figure 5:
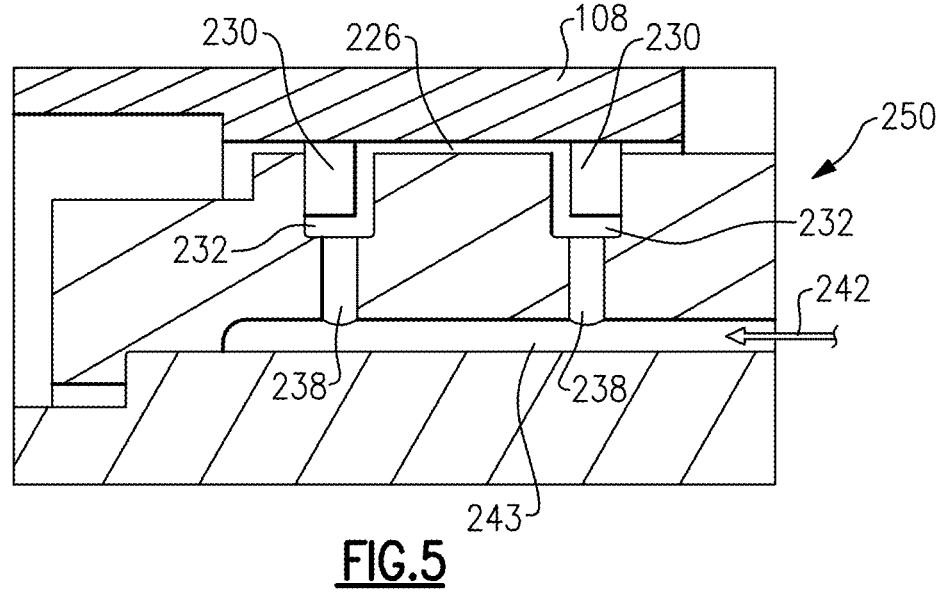
FIG. 5 shows another embodiment oil supply for a bearing damper.

Embodiment 250 shown in FIG. 5 has an inner oil supply 242 communicating into the inner passage 243, then into the passages 238 and into the seal ring grooves 232.

Figure 6:
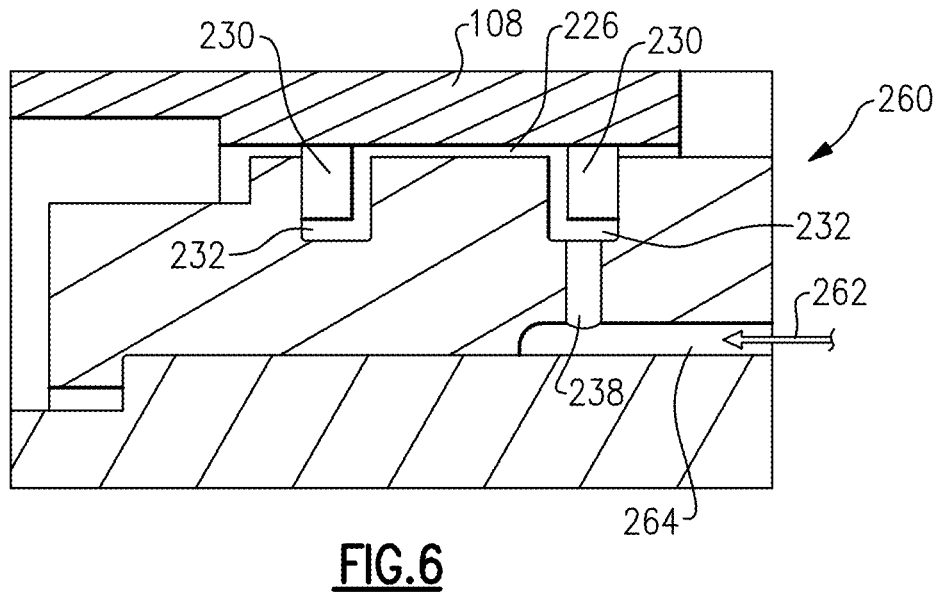
FIG. 6 shows another embodiment oil supply for a bearing damper.

In embodiment 260 as shown in FIG. 6 an oil supply 262 supplies oil into an inner passage 264, and a single passage 238. This oil moves radially outwardly, and then migrates through the damper chamber 226 to the opposed seal ring groove 232.

Figure 7:
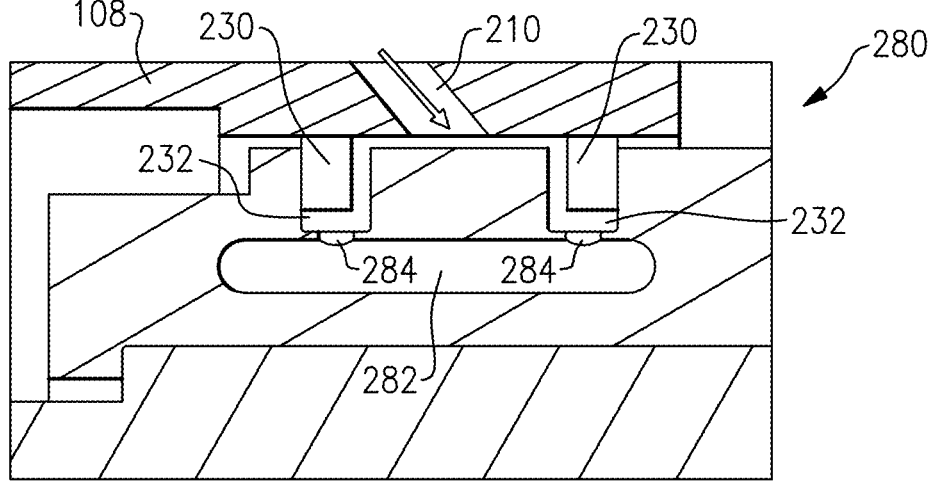
FIG. 7 shows another embodiment oil supply for a bearing damper.

FIG. 7 shows an embodiment 280, wherein the oil from both seal ring grooves 232 communicate with each other through an inner passage 282 and radially outwardly extending passages 284. In this embodiment the oil moves between the two seal ring grooves as the bearing moves.

Figure 8A:
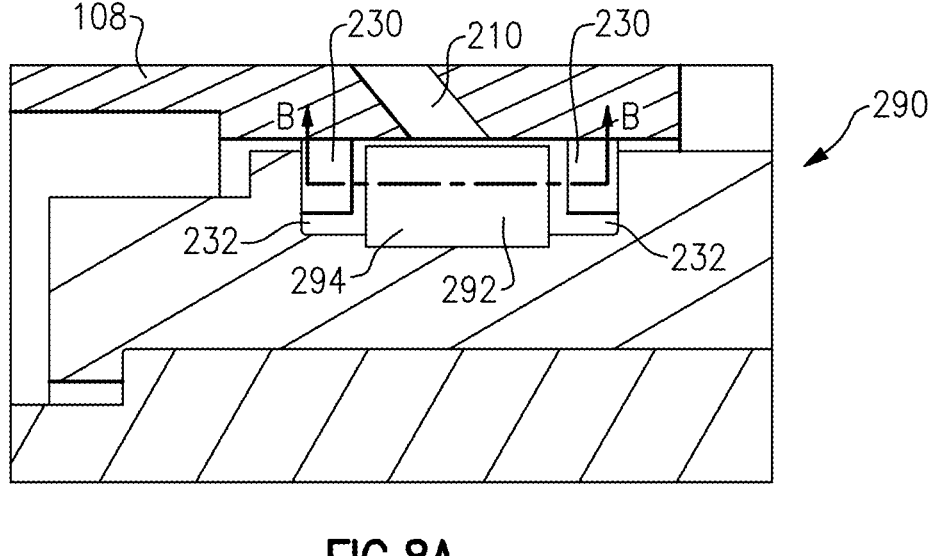
FIG. 8A shows another embodiment oil supply for a bearing damper.

FIG. 8A shows an embodiment 290. Here there is a slot 292 extending between the seal ring grooves 232 over a limited circumferential extent. An area 294 separates the two seal ring grooves 232 with the slot extending into the area 294 to allow better communication between the seal ring grooves, and better supply of lubricant.

Figure 8B:
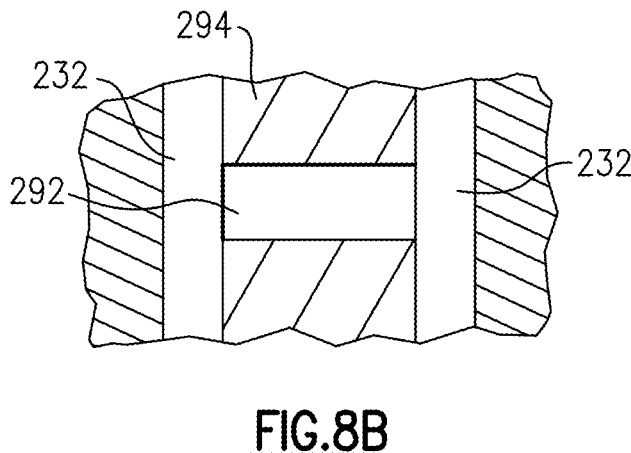
FIG. 8B is a view along B-B of FIG. 8A.

FIG. 8B is a cross-sectional view along line B-B of FIG. 8A and shows slot 292 communicating with the seal ring grooves 232 and between areas 294.

Figure 9A:
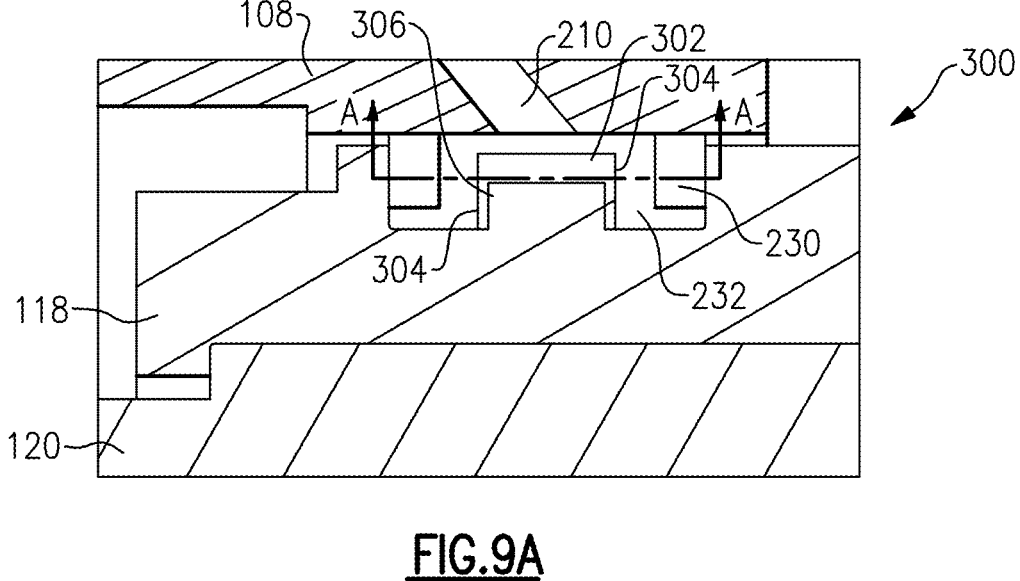
FIG. 9A is another embodiment oil supply for a bearing damper.

FIG. 9A shows an embodiment 300 having a slot 302 not unlike the slot of FIG. 8A, but further having cutouts 304 extending radially inwardly at the edge of the slot 302.

Figure 9B:
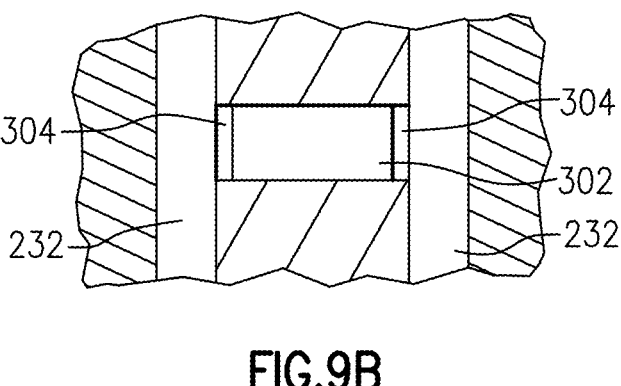
FIG. 9B is a cross-section along line B-B of FIG. 9A.

FIG. 9B shows the slots 302 and 304 communicating between adjacent seal ring grooves 232.

Figures 10, 11:
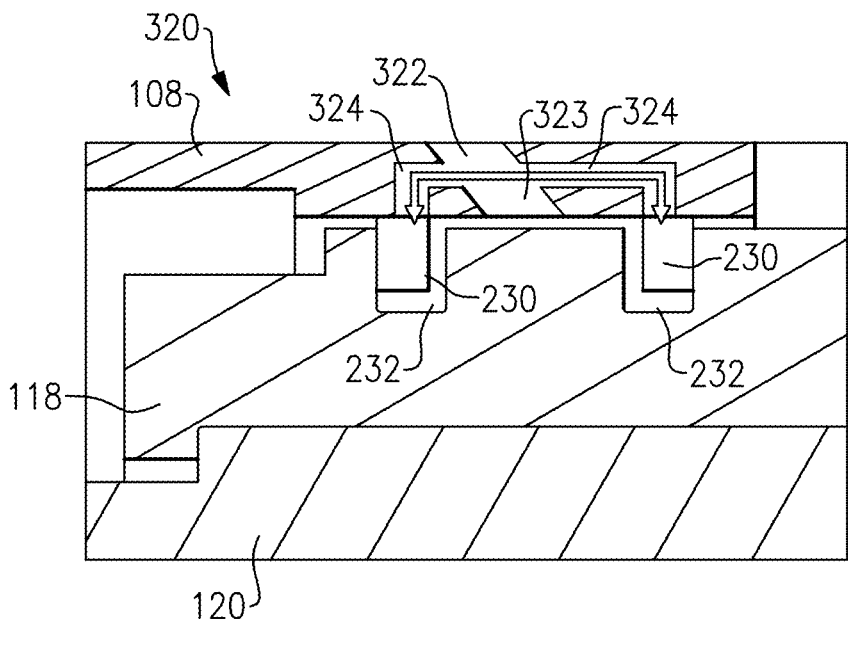
FIG. 10 shows another embodiment bearing damper.
FIG. 11 shows another embodiment bearing damper.

FIG. 10 shows an embodiment 320 wherein the oil supply 322 communicates with bridges 324 each communicating directly with a seal ring groove 232. There is a central supply 323, and the bridge supplies 324. In a sense, this embodiment delivers the oil directly into the seal ring grooves, as opposed to between the seal ring grooves. The supplies 324 are directly axially aligned and directly radially outward of seal ring grooves 232.

FIG. 11 shows an embodiment 330 which is similar to the FIG. 10 embodiment, however, the supply 332 delivers oil into arms 336 that directly communicate with the seal ring grooves 232. In a sense, the central supply 323 has been eliminated from the FIG. 10 embodiment.

Figure 12:
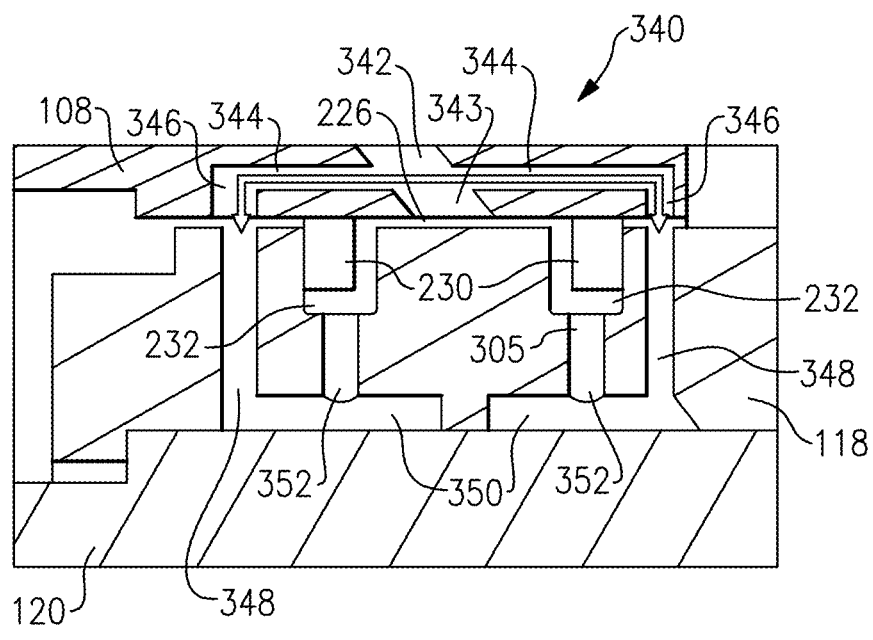
FIG. 12 shows another embodiment bearing damper.

FIG. 12 has a supply 342 delivering oil directly into the damper 226 through supply 343. However, arms 344 also branch off of the central supply 342 and into radially inwardly extending passages 346, which are axially outside the seal ring grooves 232, and then into passages 348 that extend inwardly to inner passages 350 communicating with radially outwardly extending passages 352, and into the seal ring grooves 232 beneath the seals 230.

Figure 13:
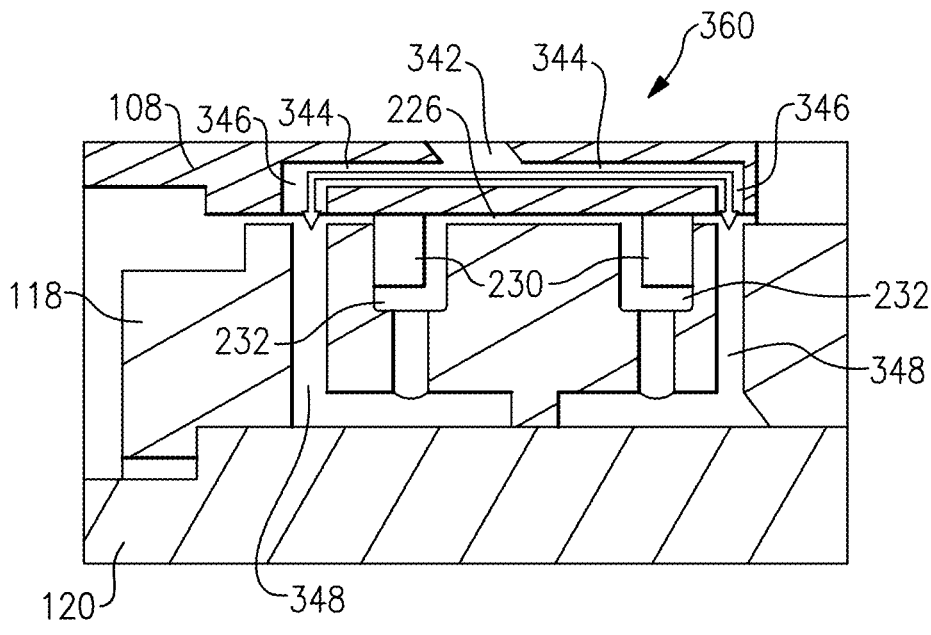
FIG. 13 shows another embodiment bearing damper.

FIG. 13 shows an embodiment 360 similar to the FIG. 12 embodiment, however, the central supply 343 has been eliminated relative to the FIG. 12 embodiment.

A gas turbine engine under this disclosure could be said to include a turbine section and a compressor section. The turbine section and the compressor section each include rotors, with a first turbine rotor driving a first compressor rotor through a shaft. A bearing compartment includes static structure a bearing supporting the shaft for rotation about a rotational axis. A damper chamber is defined radially between an outer surface of the bearing and an inner surface of the static structure. The damper chamber is defined by axially spaced seals received in seal ring grooves. A lubricant supply supplies lubricant into the damper chamber, and into the seal ring grooves. The lubricant supply includes at least one of an inner passage on an opposed radial side of the seal ring grooves relative to the damper chamber and/or an axially aligned passage directly radially outward of each of the seal seal ring groove, or a cutout in a supporting structure supporting the at least one bearing and over a limited circumferential extent, and extending to connect the seal seal ring groove.

A gas turbine engine under this disclosure could also be said to include a turbine section and a compressor section. The turbine section and the compressor section each include rotors, with a first turbine rotor driving a first compressor rotor through a shaft. A bearing compartment includes static structure and a bearing supporting the shaft for rotation about a rotational axis. A damper chamber is defined radially between an outer surface of the bearing and an inner surface of the static structure. The damper chamber is defined by axially spaced seals received in seal ring grooves. A lubricant supply supplies lubricant into the damper chamber, and into the seal ring grooves. The lubricant supply includes at least one inner passage on an opposed radial side of the seal ring grooves relative to the damper chamber.

Although embodiments of this disclosure have been shown, a worker of ordinary skill in this art would recognize that modifications would come within the scope of this disclosure. As one example, while the propulsor is disclosed as a fan it could also be an open rotor. For that reason, the following claims should be studied to determine the true scope and content of this disclosure.

What is claimed is:

1. A gas turbine engine comprising:

a turbine section and a compressor section, said turbine section and said compressor section each including rotors, with a first turbine rotor driving a first compressor rotor through at least one shaft;

at least one bearing compartment including a static structure and at least one bearing supporting the at least one shaft for rotation about a rotational axis;

a damper chamber defined radially between an outer surface of the at least one bearing and an inner surface of the static structure, and said damper chamber being defined by axially spaced seals received in seal ring grooves; and a lubricant supply for supplying lubricant into the damper chamber, and into the seal ring grooves, the lubricant supply including an inner passage on an opposed radial side of the seal ring grooves relative to the damper chamber.

2. The gas turbine engine as set forth in claim 1, wherein a radially inwardly extending passage is positioned axially intermediate the seal ring grooves, and provides lubricant into the inner passage.

3. The gas turbine engine as set forth in claim 1, wherein there is an outer lubricant supply supplying lubricant into the damper chamber, and the inner passage communicates between the oil seal ring grooves.

4. The gas turbine engine as set forth in claim 1, wherein the at least one bearing is a rolling element bearing, and there is a supporting structure connecting an outer portion of the rolling element bearing to the static structure.

5. The gas turbine engine as set forth in claim 4, wherein the supporting structure includes a flexible portion that is more flexible than a less flexible portion of the supporting structure.

6. The gas turbine engine as set forth in claim 5, wherein the flexible portion is attached to the static structure, and extending to the less flexible portion attached to the ball bearing outer race, and the inner passage, the axially aligned passage or the cutout are formed in the less flexible portion of the supporting structure.

* * * * *